United States Patent [19]

Turner et al.

[11] Patent Number: 4,755,307
[45] Date of Patent: Jul. 5, 1988

[54] PROCESS FOR MAKING DRILLING FLUID ADDITIVES CONTAINING LIGNOSULFONATES

[75] Inventors: Finis S. Turner; Lee S. Park, both of Houston, Tex.

[73] Assignee: Dresser Industries, Inc., Dallas, Tex.

[21] Appl. No.: 899,509

[22] Filed: Aug. 22, 1986

[51] Int. Cl.$^4$ .......................... C09K 7/02; C07G 1/00
[52] U.S. Cl. ............................. 252/8.514; 252/8.51; 530/506
[58] Field of Search ........................... 252/8.51, 8.514; 530/506

[56] References Cited

U.S. PATENT DOCUMENTS

| | | | |
|---|---|---|---|
| 2,935,504 | 5/1960 | King et al. | 252/8.51 X |
| 3,544,460 | 12/1970 | Markham et al. | |
| 3,634,387 | 1/1972 | Dougherty | |
| 3,962,099 | 6/1976 | Whitfill | |
| 4,220,585 | 9/1980 | Javora et al. | |
| 4,447,339 | 5/1984 | Detroit | |
| 4,457,853 | 7/1984 | Detroit | |

OTHER PUBLICATIONS

Gray, et al., Composition and Properties of Oil Well Drilling Fluids (4th Ed. 1981), pp. 570–573.

*Primary Examiner*—Herbert B. Guynn
*Attorney, Agent, or Firm*—Arnold, White & Durkee

[57] ABSTRACT

An improved process for making drilling fluid additives. The drilling fluid additives generally comprise titanium and/or zirconium lignosulfonates. The improved process of this invention can be performed without any delays caused by plugging during filtration. Filtration plugging problems are eliminated by adding only stoichiometric amounts of zirconium and/or titanium lignosulfonate to the lignosulfonate mixture prior to filtration.

13 Claims, No Drawings

PROCESS FOR MAKING DRILLING FLUID ADDITIVES CONTAINING LIGNOSULFONATES

BACKGROUND OF THE INVENTION

This invention relates to an improved process for preparing lignosulfonate additives for drilling fluids used in the drilling of oil and gas wells. The invention also relates to drilling mud additives which comprise a mixture of zirconium and titanium lignosulfonates which are substantially free of chromium.

U.S. Pat. No. 4,220,585 to Paul H. Javora and Bethel Q. Green, incorporated herein by reference, describes chromium-free drilling fluid additives effective as viscosity controlling agents. The additives are composed of complex lignosulfonates containing titanium and/or zirconium. The additives are stated to be, in many cases, more effective viscosity controlling agents than the chromium or chromium-iron lignosulfonates which are widely used in the drilling industry. The additives have the additional advantage of avoiding the toxic nature ascribed to chromium lignosulfonates.

Lignosulfonates, in accordance with U.S. Pat. No. 4,220,585, are prepared by reacting lignin liquors obtained from pulping wood with salts of the desired metal or metals. When necessary, the precipitated material can be removed. Oxidation of the material, which modifies certain properties such as the thinning or reduction of the viscosity of clay suspensions and reduction of the gel-like properties of such suspensions, can be any one of the process steps.

In the commercial preparation of the drilling fluid additives of U.S. Pat. No. 4,220,585, normally, the lignosulfonate is purchased as the calcium salt. Most of the calcium must be removed, because calcium adversely affects the viscosity control properties of the final product. A metal sulfate is added to precipitate the calcium as calcium sulfate and to form metal lignosulfonates. Typically, the calcium sulfate is removed by filtration. The added metal sulfate may be in the form of zirconium sulfate and/or titanium sulfate. Sulfuric acid may also be added to aid in precipitating the calcium sulfate.

Because of the chemically complex nature of the sulfonated lignin material prepared in accordance with U.S. Pat. No. 4,200,585, their exact chemical composition is not readily ascertainable. Consequently, reference to these compositions as "lignosulfonates" does not imply a limitation to salts formed by base-exchange chemical reactions. They may also include chelates as well as other metal complexes.

When making drilling fluid additives according to U.S. Pat. No. 4,220,585, it has been found that the filtration rate drops to zero because of total blinding or plugging of the filter cloth. Further processing of the lignosulfonate solution becomes impractical. Even with continuous cleaning of the filter cloth, only limited production is achieved. Consequently, production of these chromium-free lignosulfonate drilling fluid additives is inefficient and unduly expensive.

U.S. Pat. No. 3,544,460, to Aaron Markham and Kenneth Blackmore, relates to a sulfonated lignin-containing material and its use as an additive in drilling muds.

U.S. Pat. No. 3,634,387, to Walter Dougherty, relates to a sulfomethylated lignin-ferrochrome complex and a process for making it. A ferrochrome salt solution is used to make the lignin-containing complex. The ferrochrome salt solution is made by mixing stoichiometric amounts of a ferrous salt and a dichromate salt in order to give stability to the salt solution. A mineral acid is added to this salt solution to prevent the precipitation of hydroxides of iron or chromium upon mixing the sulfomethylated lignin solution with the salt solution.

U.S. Pat. No. 3,962,099, to Donald Whitfill, relates to a water base drilling mud composition wherein calcium ions are controlled and converted to water-insoluble plant nutrient compounds by the use of monocalcium phosphate compounds. According to this reference, at least a stoichiometric amount of a monocalcium phosphate containing compound must be added to an alkaline earth metal hydroxide.

U.S. Pat. No. 4,447,339, to William Detroit, is directed to a drilling fluid additive comprised of manganese lignosulfonates and a process for making the additive. Also described is the addition of heavy metal cations (such as iron, copper and zirconium). In one version of the process, precipitated calcium sulfate is removed from the mixture prior to complexing the heavy metal cation.

U.S. Pat. No. 4,457,853, also to William Detroit, is a continuation-in-part of U.S. Pat. No. 4,447,339, mentioned above. Boron is added to the manganese lignosulfonate to produce a manganese-boron lignosulfonate.

SUMMARY OF THE INVENTION

The present invention relates to an improved method for the making of drilling fluid additives. More particularly, the invention relates to the manufacturing of drilling fluid additives containing lignosulfonates.

It has been found that the filter plugging problem, associated with the earlier method of manufacturing chromium-free lignosulfonates, can be eliminated by carefully controlling the amounts of zirconium and/or titanium lignosulfonates which are added to the calcium lignosulfonate solution prior to filtration. It appears that highly hydrated complex metal oxides are the cause of the filter plugging problems. It also appears that adding only a stoichiometric amount reduces the amount of free titanium and/or zirconium ions that are available to form highly hydrated complex metal oxides. In particular, the amount of zirconium and/or titanium lignosulfonate should be restricted to about the stoichiometric quantity needed to react with substantially all of the calcium in the calcium lignosulfonates.

Generally, lignosulfonates, in accordance with the present invention, are prepared with a water solution of calcium lignosulfonate. A quantity of zirconium sulfate is added to the calcium lignosulfonate to form zirconium lignosulfonate and precipitate the calcium as hydrated calcium sulfate. The amount of zirconium sulfate is preferably less than the stoichiometric amount relative to the calcium and sufficient to result in not greater than about 0.5% by weight of zirconium in the final product. The remaining, unreacted calcium lignosulfonate is treated with about a stoichiometric amount of titanium sulfate to precipitate as much as possible of the remaining calcium and form titanium lignosulfonate. As discussed above, it is important that only about a stoichiometric amount of sulfate is added to react with the remaining calcium. The various components are intimately mixed to insure that the maximum amount of calcium sulfate is precipitated.

The insoluble calcium sulfate is filtered out of the mixture leaving behind primarily zirconium lignosulfonate and titanium lignosulfonate. However, it appears that a quantity of lignosulfonic acid is also present in the mixture. Therefore, a final quantity of titanium sulfate is added to the mixture so that the final product, which has been dried, preferably contains 2%-3% by weight of titanium.

A particular advantage of the present method is that the filtration of the calcium sulfate can be accomplished with greatly reduced plugging or blinding of the filter cloth. Consequently, this new method is more efficient and economical than the previous process.

DESCRIPTION OF THE PREFERRED EMBODIMENTS

The preferred method of this invention is performed in basically three steps. First, all the chemical components are mixed in a charging tank. Second, the mixture is transferred to a rotary vacuum filter, where the hydrated calcium sulfate is removed from the mixture. Finally, the filtered mixture is pumped into a second holding tank where additional chemicals may be added to the mixture. Each of these steps is explained in detail below.

Typically, a charging tank is filled with a quantity of calcium lignosulfonate solution. The calcium lignosulfonate is typically available in a water solution containing 50%-60% by weight of calcium lignosulfonate. Next, a water solution of zirconium sulfate, typically about 18% by weight of zirconium sulfate, is added to the calcium lignosulfonate solution. The zirconium sulfate reacts with the calcium lignosulfonate to: (a) precipitate calcium sulfate; and (b) simultaneously form zirconium lignosulfonate. The amount of zirconium sulfate is substantially less than the stoichiometric amount needed to react with the calcium lignosulfonate. Preferably, the amount of zirconium sulfate should not be more than an amount sufficient to result in about 0.5% by weight of zirconium in the final product.

A stoichiometric amount of titanium sulfate is added to the mixture to substantially complete the precipitation of calcium sulfate and also form titanium lignosulfonate. The stoichiometric amount is based on the amount of sulfate required to react with substantially all of the unreacted calcium lignosulfonate. The titanium sulfate is usually dissolved in a sulfuric acid solution, typically containing about 30% by weight of titanium sulfate.

The temperature of the solution is maintained at approximately 150° F. (66° C).

In an alternative embodiment of this invention, the zirconium sulfate and titanium sulfate are added simultaneously. In another alternative embodiment, titanium sulfate is used entirely, instead of adding any zirconium sulfate. In still other embodiments, iron, aluminum and/or magnesium sulfates can be substituted for the zirconium sulfate and/or titanium sulfate.

In the preferred embodiment described earlier, hydrogen peroxide is added to the mixture in the charging tank, prior to filtration. The hydrogen peroxide oxidizes the metal lignosulfonates which have been formed. It has been found that the viscosity controlling characteristics of the additive are improved by oxidation of the metal lignosulfonates.

The hydrogen peroxide is typically available in an aqueous solution containing 50% by weight of hydrogen peroxide. The total amount of hydrogen peroxide added typically ranges from 3% to 14%, preferably 9% to 12%, by weight based on the weight of the lignin contained in the initial charge of calcium lignosulfonate. However, only a portion of the total hydrogen peroxide necessary is added to the mixture before filtration because the reaction is exothermic. This step-wise addition of hydrogen peroxide insures that the temperature of the mixture does not get substantially above 150° F. If the temperature is allowed to rise too high, flashing of the solution may occur during the following filtration step. Flashing may occur because of the lower boiling point of the solution induced by the partial vacuum caused by the filter. The remainder of the hydrogen peroxide is added after the filtration.

In each of the above embodiments, the chemical mixture is preferably transferred from the charging tank to a rotary vacuum filter of the continuous operation belt discharge type. Basically, the filter assembly is comprised of a tank with a cylinder mounted and centered inside the tank. The cylinder is hollow except for a cylindrical core which is concentric with the cylinder, and which operates as a vacuum receiver. The filter cloth typically is a 2×2 chain weave multifilament polyester dacron cloth. The filter cloth is wrapped around the cylinder and a rotating gear, located exterior of the filter tank.

The fluid is charged into the tank at least to a level which will cover the cylindrical vacuum core. The vacuum created in the cylindrical core causes the fluid to flow from the tank, through the cylinder and the filter cloth, into the cylindrical core. As the cloth is rotated around the cylinder, calcium sulfate is removed as the mixture passes through the filter cloth. The portion of the cloth which is deposited with calcium sulfate eventually emerges from the fluid at the top of the rotation of the cylinder.

The filter cloth contains both calcium sulfate and the metal lignosulfonate products. Water is sprayed on the cloth to wash the cloth of the lignosulfonate products. The remaining calcium sulfate dries as it is carried along by the cloth. When the cloth rotates around the exterior gear, the dried calcium sulfate drops off due to the angle of rotation and ridges on the gear. The filter cloth is back-washed with warm water and is ready to remove more calcium sulfate.

The filtered mixture is transferred into a holding tank. Additional chemicals are added which further modify the lignosulfonates. A second amount of titanium sulfate is normally added to the filtered mixture. It has been found that the best viscosity control characteristics are obtained when the final product contains 2%-3% by weight of titanium. It is believed that the additional titanium lignosulfonate reacts with lignosulfonic acid contained in the filtrate. The remainder of the hydrogen peroxide is also added to the mixture to complete the oxidation of the metal lignosulfonates.

Although the preferred embodiments of this invention have been described hereinabove in some detail, it should be appreciated that these embodiments are capable of variation and modification. The description of this invention is not intended to be limiting, but is merely illustrative of the preferred embodiments.

What is claimed is:

1. A method for preparing a drilling fluid additive from an aqeuous solution of calcium lignosulfonate, comprising the steps of:
   (a) reacting with said solution a first amount of a metal sulfate selected from the group consisting of titanium sulfate, zirconium sulfate or combinations thereof said first amount being less than the stoichiometric amount relative to said calcium;

(b) precipitating a first portion of said calcium from said solution;

(c) adding an amount of said metal sulfate sufficient to react with substantially all of the remaining calcium lignosulfonate, but not greater than about a stoichiometric amount of said metal sulfate relative to said remaining calcium lignosulfonate, to precipitate a second portion of the calcium;

(d) filtering said precipitated calcium from the mixture; and (e) adding to the filtered mixture of step (d), an additional amount of titanium sulfate.

2. The method of claim 1, wherein said additional amount of titanium sulfate is sufficient to result in a concentration of about 2%–3% by weight of titanium based on the dry weight of said mixture.

3. The method of claim 1, further comprising the addition of an amount of hydrogen peroxide prior to filtration of the calcium, said amount of hydrogen peroxide being up to about 14% by weight of the lignin contained in said calcium lignosulfonate solution but also being insufficient to raise the temperature of the mixture substantially above 150° F.

4. A method for preparing a drilling fluid additive from an aqueous solution of calcium lignosulfonate, comprising the steps of:

(a) forming a mixture by adding to said calcium lignosulfonate solution an amount of metal sulfate selected from the group consisting of titanium sulfate, zirconium sulfate or combinations thereof functionally effective to precipitate a portion of said calcium;

(b) adding titanium sulfate in a quantity substantially equal to, but not greater than that necessary to provide a total amount of sulfate in said mixture to react stoichiometrically with substantially all of said calcium and to prcipitate an additional portion of said calcium;

(c) adding an amount of hydrogen peroxide to the mixture of step (b), said amount of hydrogen peroxide being insufficient to raise the temperature of the mixture substantially above 150° F.;

(d) removing said precipitated calcium from said mixture by filtration; and (e) adding to the filterd mixture of step (d), a further amount of hydrogen peroxide and an additional amount of titanium sulfate, said total amount of hydrogen peroxide added in steps (c) and (e) being not greater than about 14% by weight of the lignin contained in said lignosulfate solution.

5. The method of claim 4, wherein said calcium lignosulfonate in said solution is up to about 60% by weight of said solution.

6. The method of claim 4, wherein said additional amount of titanium sulfate in step (e) is sufficient to result in a concentration of about 2%–3% by weight of titanium based on the dry weight of said mixture of step (e).

7. The method of claim 4, wherein only an amount of zirconium sulfate is added in step (a), said amount being functionally effective to result in a final product having about 0.5% by weight of zirconium based on the dry weight of said mixture of step (e).

8. The method of claim 4, wherein the total amount of hydrogen peroxide added is from about 9% to about 12% by weight of the lignin contained in said calcium lignosulfonate solution.

9. A method for preparing a drilling fluid additive from an aqueous solution containing up to about 60% by weight of calcium lignosulfonate, comprising the steps of:

(a) forming a mixture by adding to said calcium lignosulfonate solution an amount of zirconium sulfate to precipitate calcium sulfate, said amount of zirconium sulfate being substantially less than the stoichiometric amount relative to said calcium;

(b) adding titanium sulfate in an amount substantially equal to, but not greater than, the stoichiometric amount relative to the remaining unprecipitated calcium, to precipitate said remaining calcium;

(c) adding an amount of hydrogen peroxide, said amount being insufficient to raise the temperature of the mixture substantially above 150° F.;

(d) removing said calcium sulfate from the mixture of step (c) by filtration;

(e) adding more hydrogen peroxide to the filtered mixture of step (d), said total amount of hydrogen peroxide added in steps (c) and (e) being not greater than about 14% by weight of the lignin contained in said calcium lignosulfonate solution; and (f) adding an additional amount of titanium sulfate sufficient to result in a concentration of about 2%–3% by weight of titanium based on the dry weight of said filtered mixture.

10. The method of claim 9, wherein the total amount of hydrogen peroxide is from about 9% to about 12% by weight of the lignin contained in said calcium lignosulfonate solution.

11. A method for preparing a drilling fluid additive from an aqueous solution of calcium lignosulfonate, comprising the steps of:

(a) forming a mixture by adding to said lignosulfonate solution a quantity of titanium sulfate substantially equal to, but not greater than, a stoichiometric amount relative to said calcium to precipitate calcium sulfate;

(b) removing said calcium sulfate by filtration; and (c) adding an additional amount of titanium sulfate sufficient to result in a concentration of about 2%–3% by weight of titanium based on the dry weight of said mixture.

12. A method for preparing a drilling fluid additve from an aqueous solution of calcium lignosulfonate, comprising the steps of:

(a) reacting with said solution an amount of zirconium sulfate and titanium sulfate, the total amount of zirconium sulfate and titanium sulfate being substantially equal to, but not greater than, a stoichiometric amount relative to said calcium;

(b) precipitating calcium sulfate from said solution;

(c) removing said calcium sulfate by filtration; and (d) adding an additional amount of titanium sulfate sufficient to result in a concentration of about 2%–3% by weight of titanium based ion the dry weight of said mixture.

13. The method of claim 12, wherein the amount of zirconium sulfate is suffficient to result in a final product having about 0.5% by weight of zirconium based on the dry weight of said mixture.

* * * * *

UNITED STATES PATENT AND TRADEMARK OFFICE
CERTIFICATE OF CORRECTION

PATENT NO. : 4,755,307
DATED : July 5, 1988
INVENTOR(S) : FINIS S. TURNER and LEE S. PARK It is certified that error appears in the above-identified patent and that said Letters Patent are hereby corrected as shown below:

In Column 5, line 37, "prcipitate" should read --precipitate--.

In Column 5, line 45, "filterd" should read --filtered--.

Signed and Sealed this

Sixth Day of December, 1988

Attest:

DONALD J. QUIGG

*Attesting Officer*   Commissioner of Patents and Trademarks